United States Patent
Baker et al.

(10) Patent No.: US 8,355,208 B1
(45) Date of Patent: Jan. 15, 2013

(54) QUICK ADJUSTMENT MECHANISM FOR HEAD OR HELMET MOUNTED DISPLAYS

(75) Inventors: Ross J. Baker, Oceanside, CA (US); James W. Porter, San Marcos, CA (US); Thomas P. Primosch, San Marcos, CA (US); David J. Resetco, Carlsbad, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 211 days.

(21) Appl. No.: 12/815,649

(22) Filed: Jun. 15, 2010

(51) Int. Cl.
*G02B 27/14* (2006.01)
*G09G 5/00* (2006.01)

(52) U.S. Cl. ............................................. 359/630; 345/8
(58) Field of Classification Search .......... 359/630–632; 345/7–9; 348/115
See application file for complete search history.

(56) References Cited

U.S. PATENT DOCUMENTS

| | | | |
|---|---|---|---|
| 4,968,123 A | 11/1990 | Fournier | |
| 5,954,642 A | 9/1999 | Johnson | |
| D415,146 S | 10/1999 | Hori | |
| 5,991,085 A | 11/1999 | Rallison | |
| 6,369,952 B1 | 4/2002 | Rallison | |
| 7,100,881 B2 | 9/2006 | Worrall | |
| 7,193,783 B2 | 3/2007 | Willey | |
| 7,568,672 B2 | 8/2009 | Ferrer | |
| 2006/0007562 A1 | 1/2006 | Willey | |
| 2009/0243965 A1 | 10/2009 | Price | |

OTHER PUBLICATIONS

NVISOR MH60-E Modular Head-Mounted Display (http://www.nvisinc.com/product2009.php?id=58) downloaded May 10, 2010 12:24:23 PM (1 of 2 and 2 of 2) plus 1 page of web link re: nVisor MH60-E downloaded concurrently therewith.

*Primary Examiner* — Alicia M Harrington
(74) *Attorney, Agent, or Firm* — Donna P. Suchy; Daniel M. Barbieri (57) ABSTRACT

A quick adjustment assembly for a head or helmet mounted display. The quick adjustment assembly includes an adjustment plate assembly securely attachable to the head of a user via a helmet or head gear. An eye relief assembly is mountable on the adjustment plate assembly. The eye relief assembly includes a main frame for supporting at least one image source assembly (ISA). A pair of opposing pressure plate assemblies are supported by the main frame. Each pressure plate assembly includes an eye relief adjustment release element engageable by the user; and at least one pressure plate friction pad assembly operatively engageable with the adjustment plate assembly. The pressure plate friction pad assembly provides selectable positioning of the eye relief assembly along a plane of movement relative to the adjustment plate assembly allowing three-degrees of freedom movement along the plane of movement. The eye relief assembly preferably includes an interpupillary (IPD) adjustment assembly securely mounted thereon.

17 Claims, 10 Drawing Sheets

QUICK ADJUSTMENT MECHANISM FOR HEAD OR HELMET MOUNTED DISPLAYS

BACKGROUND OF THE INVENTION

1. Field of the Invention

The present invention relates generally to head and helmet mounted displays (HMDs); and, more particularly to a quick adjustment mechanism therefor.

2. Description of the Related Art

Head/Helmet Mounted Displays (HMDs) are often difficult and time consuming to adjust and sometimes require a technician to perform the adjustment for the user. Positioning adjustments are desirable because of anthropometric variability between users. For example, a device affixed in a permanent location on a particular headgear would only lie in the line of sight of a very small portion of the people in a given population. In order to accommodate anthropometric variation, some conventional mechanisms provide a forward tilt, a lateral slide, and a vertical adjustment. Additional features on some mounting mechanisms provide for the removal of the device and/or a flip-away or slide mechanism to allow storage of the device away from the line of sight when not in use. Conventional adjustment mechanisms often require the user to adjust each degree of freedom successively.

U.S. Pat. No. 7,193,783 entitled "Mounting/Adjusting Mechanism for Vision Enhancement System," discloses a mounting assembly for a vision enhancement device and associated vision enhancement display, the assembly comprising a display mounted to an arm positionable in front of the user's eye, a base member for receiving a cradle for the vision enhancement device and for attaching to a head-mounting platform, and one or more intermediate members for connecting the arm to the cradle. In one embodiment, the mounting system comprises one or more mechanisms for aligning the display optical axis with the vision enhancement device optical axis and with the user's line of sight, one or more mechanisms for orienting the vision enhancement device within multiple degrees of freedom without changing the alignment of the display optical axis with the device optical axis, and one or more mechanisms for toggling the display between an in-use position to at least one storage position, and, optionally, between right eye and left eye positions.

The '783 patent system is relatively complicated and time-consuming. There are multiple interfaces for XYZ and tilt adjustment that result in a multistep process to obtain nominal placement of the image source assembly (ISA) in front of the eye. These interfaces are not intuitively located or designed for easy operation. For example, an inverting arm that attaches to a display slide assembly appears to be flimsy and unstable. This is only implemented in a monocular system. Some of the parts also seem to be very complicated and difficult to manufacture.

U.S. Pat. Application No. 20090243965 entitled, "Lightweight Head Mounted Display with Multiple Adjustments," discloses an assembly with a frame comprising a base adapted to rest on a top portion of a head of a user, a front frame portion adapted to rest against a front portion of the head of the user, and a rear frame portion adapted to rest against a back portion of the head of the user. The assembly also includes an optical display housing. Additionally, the assembly includes an adjustment mechanism configured to adjust a distance between the front frame portion and the rear frame portion while maintaining the optical display housing at a constant angle relative to the base. The instant abstract is neither intended to define the invention disclosed in the specification nor intended to limit the scope of the invention in any way. The '965 system does not appear to be a quick adjustment mechanism. Interfaces are not intuitive and difficult to find blindly. Also, the '965 mechanism has a very high part count.

U.S. Pat. No. 5,954,642, entitled, "Adjustable Head Mounted Display and System," discloses a head mounted display that includes a head suspension apparatus and a display coupled thereto. In a stationary state, the display is maintained in a desired position relative to the head suspension apparatus. Further, in a release state, the display is always freely movable both vertically and horizontally relative to the head suspension apparatus. In addition, the display may also always be freely rotatable about an axis of the display as well as vertically and horizontally. The coupling of the display to the head suspension apparatus may be attained using a slide bar and hinge mechanism that forms a rigid triangular structure when the display is in the stationary state. Further, the head suspension apparatus may include an adjustable temporal support element for positioning about the circumference of a user's head and an adjustable crown support connected to the temporal support with the crown support including channels for allowing electrical connection lines to move freely therein.

The '642 mechanism includes a knob in the middle that may be hard to reach/find. The IPD knob adjusts both eyes at once which provides a deficiency because people's faces/eyes are not perfectly symmetrical about the centerline of the head. One eye may be further from the center then the other.

U.S. Pat. No. Des. 415,146, issued to K. Hori, entitled "Head Mounted Display," discloses the ornamental design for a head mounted display.

NVIS, Inc., Reston, Va., manufactures a modular head mounted display, known as the nVisor MH60-E, that provides motion trackers, eye trackers, and video see-through capabilities. The NVIS device does not appear to provide for very quick adjustment. The user has to move his hands away from the eye relief levers and toward the IPD knobs. This results in a less intuitive process as the user then has to blindly hunt for the knobs which are not visible to the user while wearing the HMD. Furthermore, it is not intuitive as to where the IPD knobs are positioned.

As will be disclosed below, the quick adjustment mechanism of the present invention is designed as an intuitive, easy to use interface for the user to quickly adjust the HMD vertically, tilt, eye relief and interpupillary distance (IPD) in 15 seconds or less.

SUMMARY OF THE INVENTION

In a broad aspect, the present invention is a quick adjustment assembly for a head or helmet mounted display. The quick adjustment assembly includes an adjustment plate assembly securely attachable to the head of a user via a helmet or head gear. An eye relief assembly is mountable on the adjustment plate assembly. The eye relief assembly includes a main frame for supporting at least one image source assembly (ISA). A pair of opposing pressure plate assemblies are supported by the main frame. Each pressure plate assembly includes an eye relief adjustment release element engageable by the user; and at least one pressure plate friction pad assembly operatively engageable with the adjustment plate assembly. The pressure plate friction pad assembly provides selectable positioning of the eye relief assembly along a plane of movement relative to the adjustment plate assembly allowing three-degrees of freedom movement along the plane of movement.

This is particularly advantageous in that it accommodates a wide range of users. It is also exceptional for use in a training environment. In simulation and training environments there are multiple users with a wide variety of head size wearing the HMD. The intuitive design allows the trainers to have increased throughput (therefore lower cost) and/or have a greater percentage of the allotted time dedicated to training rather than fitting the equipment to the users.

The present invention provides intuitive adjustment interfaces, low part count, and simple part design for high production manufacturing (injection molding). It is repeatedly demonstrated to be fully adjusted in 15 seconds and less by new users.

The eye relief assembly preferably includes an interpupillary (IPD) adjustment assembly securely mounted thereon. The interpupillary distance (i.e. IPD) is the distance between the pupils on a person. The IPD adjustment assembly includes a rail assembly secured to the main frame; a pair of IPD adjustment assembly release elements; and, a pair of IPD springs.

DETAILED DESCRIPTION OF THE INVENTION

Figure 1:
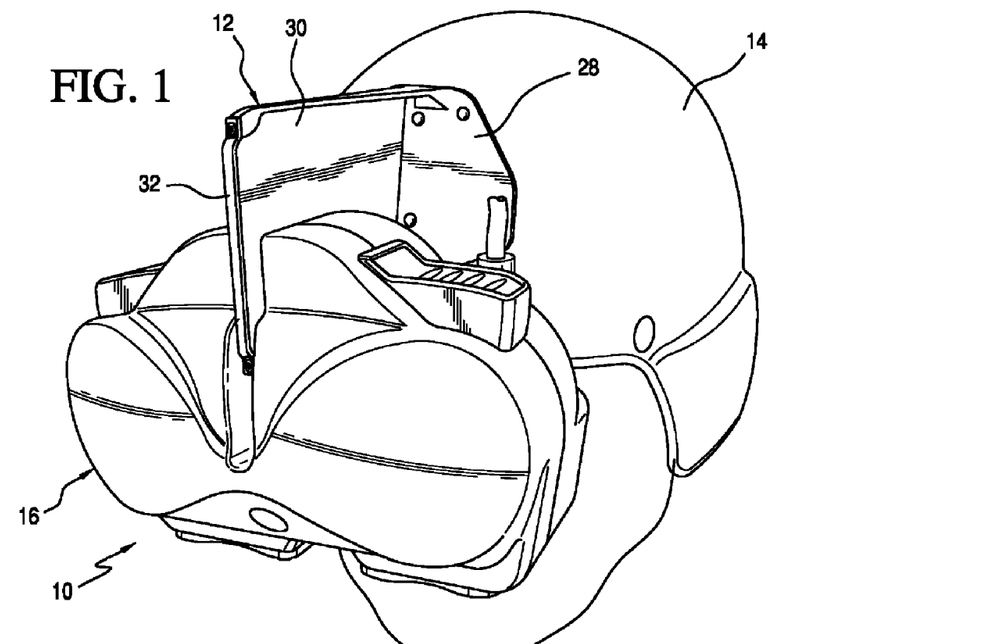
FIG. 1 is a perspective of the quick adjustment assembly attached to a helmet.
Figure 2:
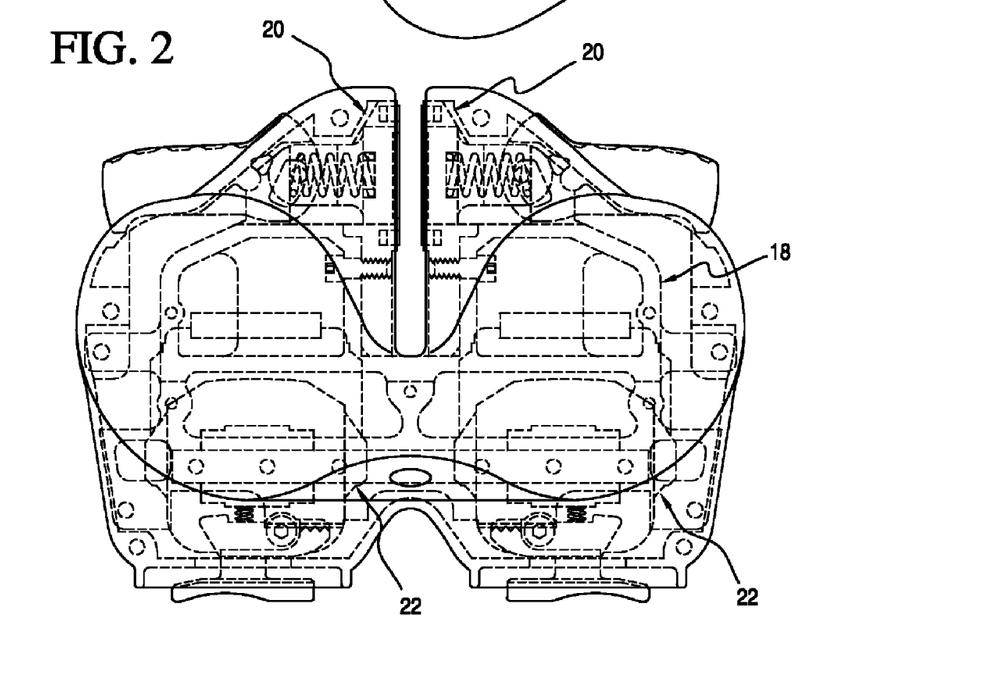
FIG. 2 is a front view of the eye relief assembly.

Referring now to the drawings and the characters of reference marked thereon, FIG. 1 illustrates a preferred embodiment of the quick adjustment assembly of the present invention, designated generally as 10. The quick adjustment assembly 10 includes an adjustment plate assembly, designated generally as 12, which is securely attachable to the head of a user via a helmet 14 or headgear. An eye relief assembly 16 is mountable on the adjustment plate assembly 12, as shown in FIG. 3 and discussed in detail below.

Figure 3:
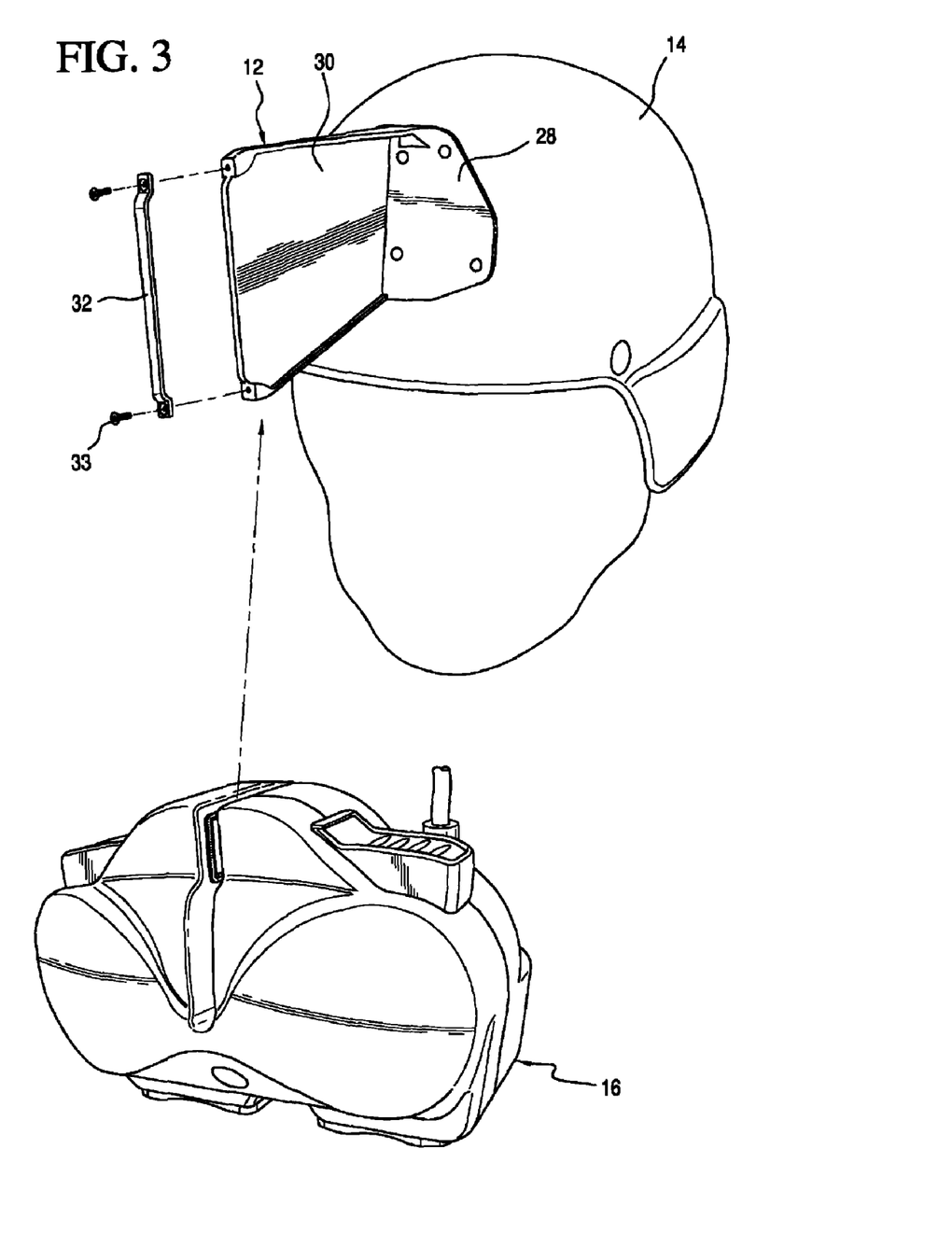
FIG. 3 is a perspective view of the eye relief assembly shown positioned toward the adjustment plate assembly.
Figure 4:
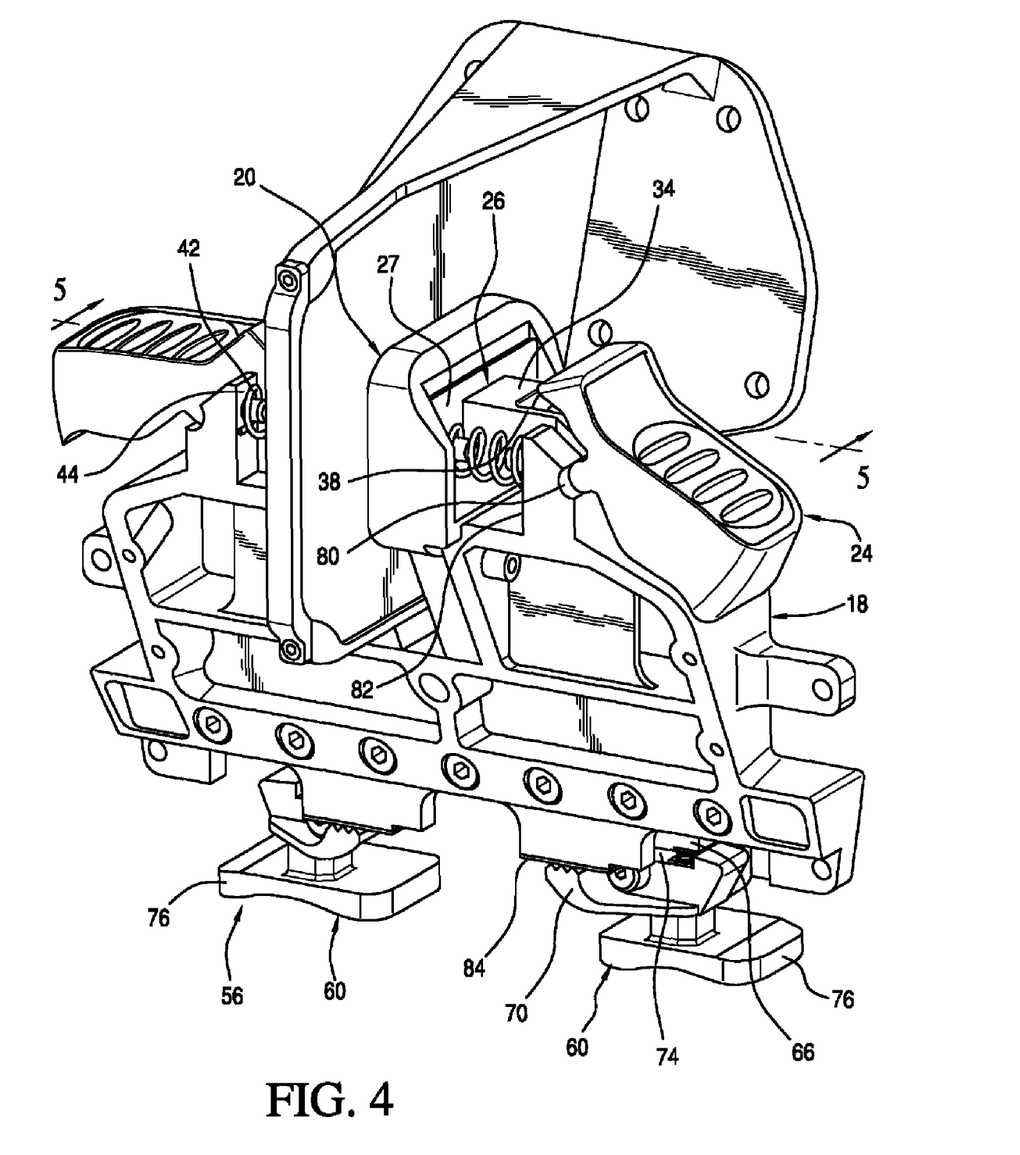
FIG. 4 is a front perspective view of the quick adjustment assembly of the present invention.
Figure 7:
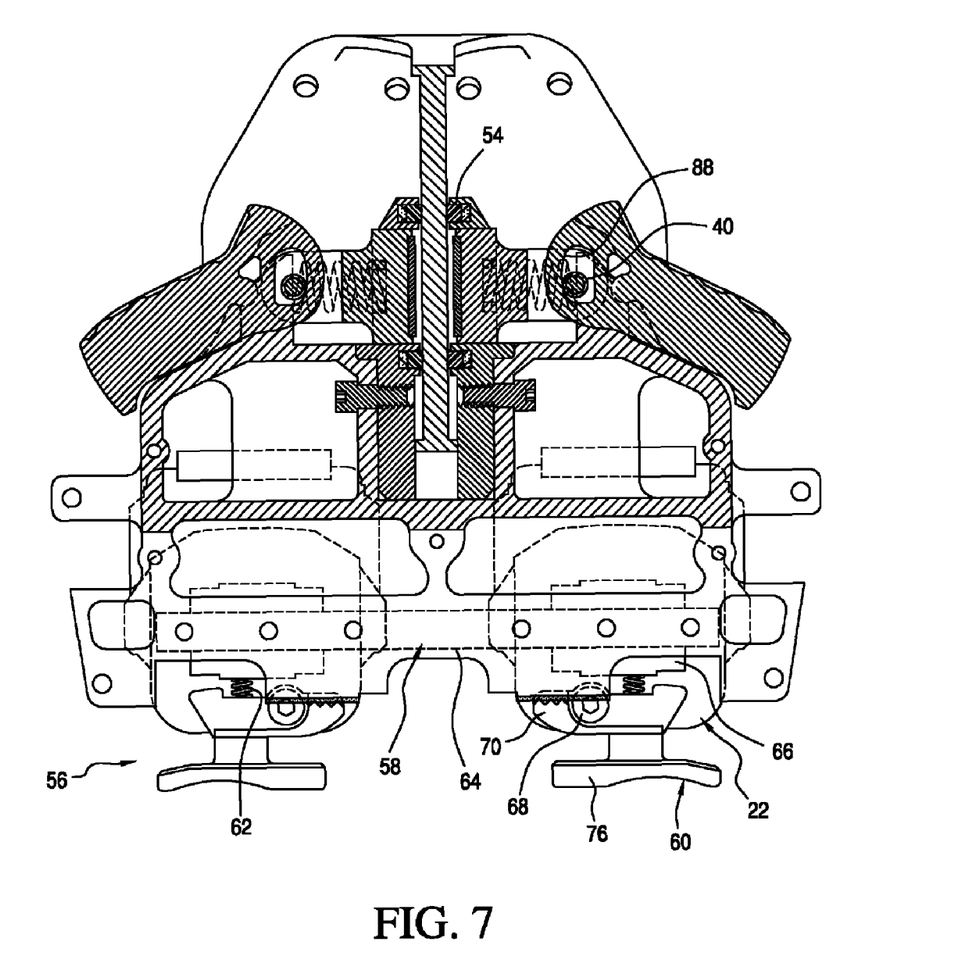
FIG. 7 is a similar view to FIG. 5, showing the actuation of the pressure plate friction pad assemblies so that the pads are separated allowing insertion or removal of the adjustment plate assembly.

Referring now additionally to FIGS. 3, 4 and 7, the eye relief assembly 16 includes a main frame 18 and a pair of opposing pressure plate assemblies 20 supported by the main frame 18. The main frame 18 supports two image source assemblies (ISA's) 22. Each ISA is an assembly consisting of an image source such as, but not limited to, a Liquid Crystal Display (LCD), Organic Light Emitting Diode (OLED), scanned laser, micro-electro-mechanical system (MEMS) such as a DLP® system or GLV® device; and, optics to create a virtual image to the user. Eye relief is the distance between the nearest point of the HMD and the eye when the HMD is properly positioned in front of the eye.

Each pressure plate assembly 20 includes an eye relief adjustment release element 24 engageable by the user. It also includes at least one pressure plate friction pad assembly 26 operatively engageable with the adjustment plate assembly 12 to provide selectable positioning of the eye relief assembly 16 along a plane of movement relative to the adjustment plate assembly 12 allowing three-degrees of freedom movement along the plane of movement.

Referring again now to FIG. 1, the adjustment plate assembly 12 includes a mounting interface portion 28 for secure attachment to the helmet 14 or headgear, a substantially flat plate element 30 integral to the mounting interface portion 28; and, a retaining cap 32 securely attachable to the plate element 30 for maintenance, assembly, and serviceability. The mounting interface portion 28 and substantially flat plate element 30 are preferably formed of a rigid plastic. The plate element 30 is preferably in a range of about 0.060-0.100 inches thick, most preferably, about 0.080 inches thick. Furthermore, the plate element 30 and mounting interface portion 28 are preferably one integral piece. The retaining cap 32 is also preferably formed of rigid plastic. The retaining cap 32 has a greater thickness to retain the eye relief assembly 16. The plate element 30 has a frame about the remainder of its perimeter to retain the other portions of the eye relief assembly 16. FIG. 3 shows the retaining cap 32 and its retaining fasteners 33 removed.

Each of the opposing pressure plate friction pad assemblies 26 includes a shaft portion 34 connected to the eye relief adjustment release element 24; a pressure plate portion 27 (having guide ribs) connected to the shaft portion 34; and, a high coefficient of friction pad 36 connected to the pressure plate portion 27. The shaft portion 34 is connected via a clevis 38 to the eye relief adjustment release element 24. The eye relief adjustment release element 24 is a lever element mounted on the clevis 38 with a cam profile. It is connected via a bushing and dowel pin 40. A spring 42 is positioned between the pressure plate portion 27 and a spring seat 44 on the main frame 18. The high coefficient of friction pad 36 is preferably an elastomeric rubber or plastic. The high coefficient of friction must be sufficiently high so as to securely and rigidly hold the device in place, typically in a range of about 0.9 to 3.1 and above.

Figure 5:
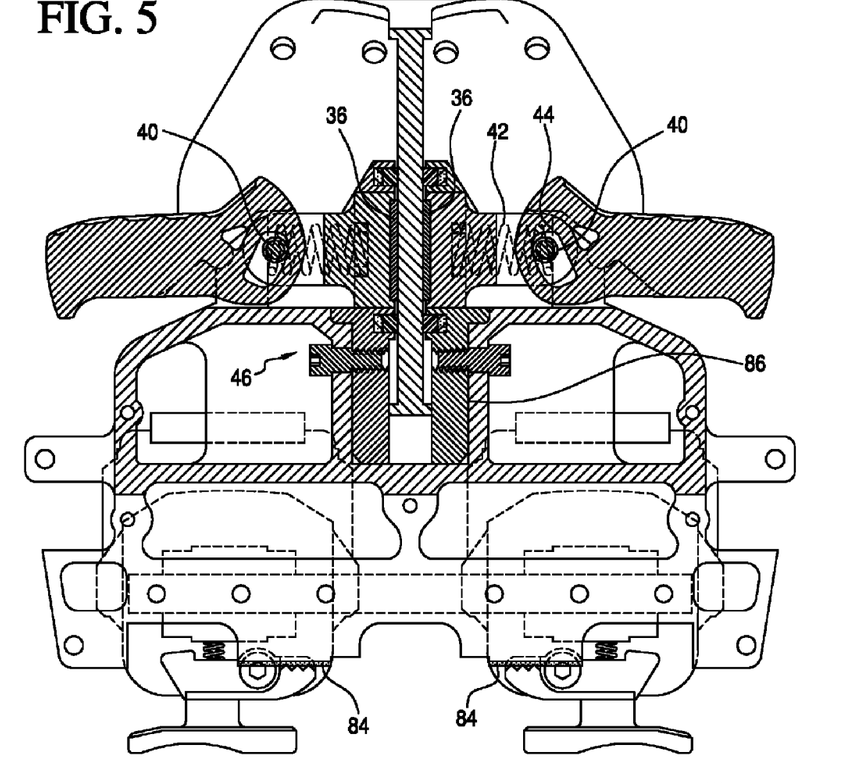
FIG. 5 is a sectional view taken along line 5-5 of FIG. 4.
Figure 6:
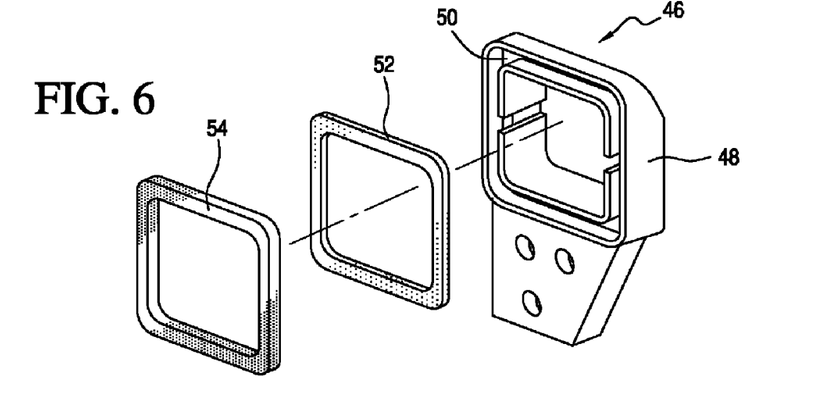
FIG. 6 is a perspective view of the bearing plate frame assembly of the present invention.

Referring now to FIG. 5, the eye relief assembly 16 includes a pair of bearing plate assemblies, designated generally as 46. Each bearing plate assembly 46 includes a bearing plate frame 48 having a recess 50; compressible material 52 positioned in the recess 50; and, a low coefficient of friction pad 54 operatively positioned relative to the compressible material 52. The low coefficient of friction must be sufficiently low so as to provide smooth and stable movement allowing for minute adjustments, typically in a range of about 0.05 to 0.2.

The bearing plate assembly, with it bearing pads, acts as a dynamic positioning guide during eye relief adjustment to keep the centerline of the HMD aligned to the centerline of the head. This allows the user to properly position the HMD while the friction pads are retracted such that the HMD doesn't move laterally (C/L of HMD moves away from the C/L of the head during eye relief adjustment). If these bearing pads are eliminated lateral movement will then be possible during eye relief adjustment which may cause the HMD to move out of place to what the user thought was a correct position when the brake pads engage the vertical alignment plate. This could be frustrating and cause a longer amount of time to properly adjust the mechanism.

Referring now to FIG. 7, the eye relief assembly 16 preferably includes an interpupillary (IPD) adjustment assembly securely mounted thereon, designated generally as 56. The interpupillary distance (i.e. IPD) is the distance between the pupils on a person. The IPD adjustment assembly 56 includes a rail assembly 58 secured to the main frame 18; a pair of IPD adjustment assembly release elements 60; and, a pair of IPD springs 62.

The rail assembly 58 includes a rail 64 and a pair of carriages 66 slidably supported by the rail 64. Each carriage 66 is adapted to securely support an associated ISA 22, by bolts 68.

Each IPD adjustment assembly release element 60 includes an IPD adjustment assembly gripping portion 70 for securely positioning the IPD adjustment assembly release element 60 relative to an IPD adjustment assembly mounting interface 72 (see FIG. 14) of the main frame 18; and, an IPD adjustment assembly spring engaging portion 74. A grasping portion 76 of the IPD adjustment assembly release element 60 is secured to the gripping portion 70 and is engageable by the user. The grasping portion 76 is engaged by the user's thumbs. A bolt 68 mounts a pivot shaft 79 (see FIGS. 7 and 15) that provides for rotatable engagement with an associated carriage 66 through the ISA 22.

Each IPD spring 62 is positioned between a respective IPD spring engaging portion 74 and an ISA 22 for providing a clamping of the ISA 22 to the main frame 18.

The main frame 18 includes a plethora of interfaces. It includes a pair of eye relief adjustment release element interfaces (i.e. seats 80) for providing the center of rotation for the eye relief adjustment release element 24 and a pair of eye relief adjustment release element spring seats 82. As mentioned above, the main frame 18 also includes the IPD adjustment assembly mounting interface 72 (see FIG. 14) for mounting the IPD adjustment assembly to the main frame 18 and a pair of ISA locating interfaces 84 for positively locating the ISA's 22. It also includes a bearing plate assembly interface portion 86 best seen in FIG. 5.

In a first step of operation, as can be seen in FIG. 3, the operator holds the eye relief assembly 16 (including its secured IPD adjustment assembly 56) and it is positioned toward the adjustment plate assembly 12. The eye relief adjustment release elements (i.e. levers) 24 are pushed down (i.e. depressed), as shown in FIG. 7, to retract the pressure plate assemblies 20. This allows the adjustment plate assembly 12 to be inserted there between. The pressure plate assemblies 20 are retracted as a result of the cam profile 88 on the levers 24. The bushing and dowel pin 40 follow the cam surface, pulling back the pressure plate assemblies 20.

When the pressure plate assemblies are so retracted, the eye relief assembly 16 is free to translate and rotate in one plane to obtain proper eye relief and adjust tilt and vertical position. The bearing plate assemblies 46 with a pair low coefficient of friction pads 54 constrain the eye relief assembly 16 to be moved in one plane only. The low coefficient of friction pads 54 are in constant contact with the adjustment plate assembly 12.

When the proper eye relief is realized, the levers 24 are released and the spring 42 forces the pressure plate assemblies 20 against the adjustment plate assembly 12.

Figure 8:
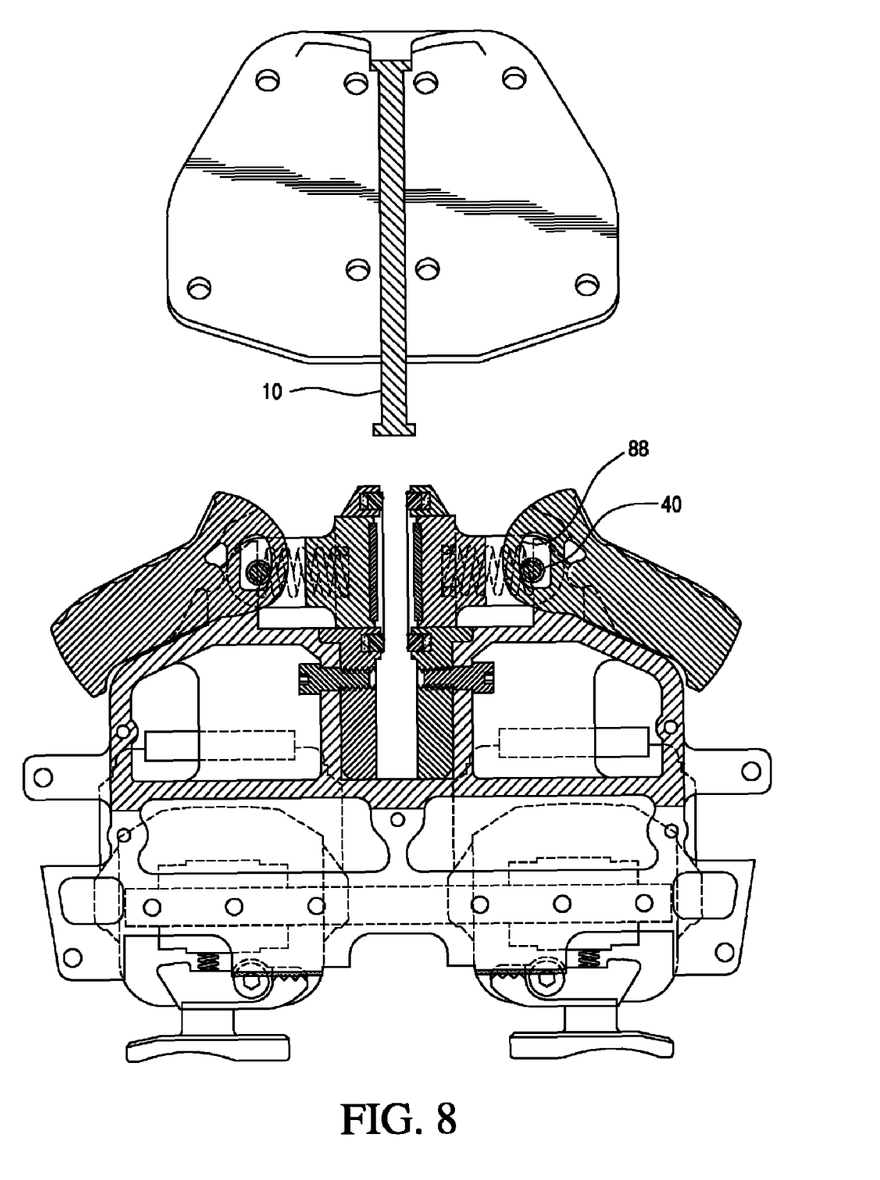
FIG. 8 is a similar view as FIG. 7, however, in this view, the adjustment plate assembly is shown removed.

FIG. 8 is a similar view as FIG. 7. However, in this view, the adjustment plate assembly 12 is shown being removed.

Figure 9:
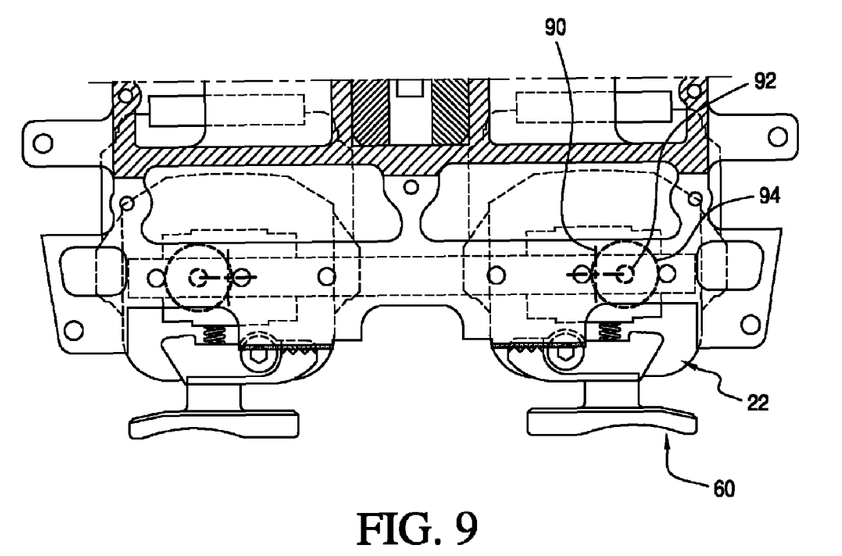
FIG. 9 is a front elevation view of the interpupillary (IPD) adjustment assembly at a first position; crosshairs being shown centered in the middle of the image source assemblies (ISA's).

FIG. 9 is a front elevation view of the interpupillary (IPD) adjustment assembly 56 at a first position, crosshairs 90 being shown centered in the middle of the image source assemblies (ISA's) 22. In this configuration, the right and left ISA's are not centered on the pupil 92 of the eye 94. The ISA's 22 are securely locked into place due to the locking portion 78 (see also FIG. 15) of the IPD adjustment assembly release elements 60 making contact with the IPD locking interface element 84 on the main frame 18 (see also FIG. 4). The IPD release elements are forcibly engaging the main frame 18 by the IPD spring 62.

Figure 10:
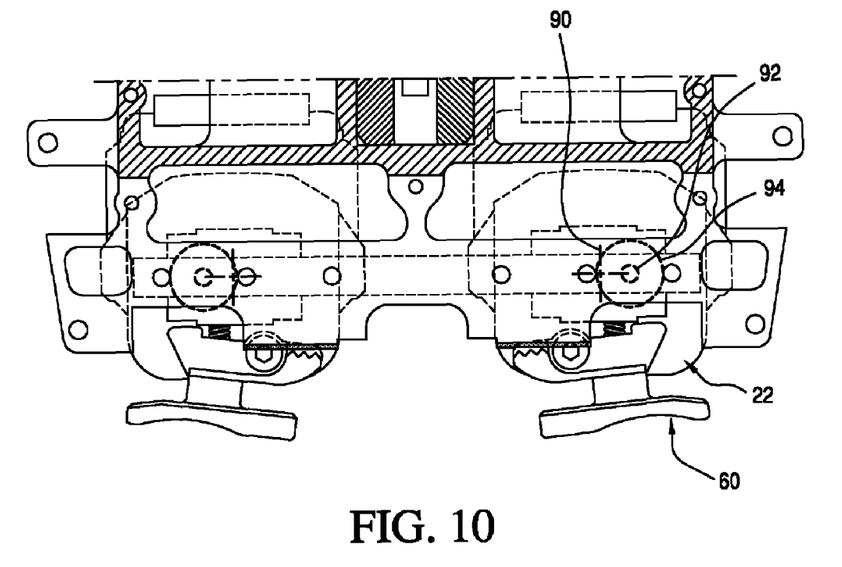
FIG. 10 shows the IPD release elements open.

FIG. 10 shows the IPD release elements 60 open. In this configuration, the right and left ISA's are not centered on the pupil 92 of the eye 94. The ISA's 22 are free to move along the rail due to the locking portion 78 of the IPD adjustment assembly release elements 60 no longer making contact with the IPD locking interface element 84 on the main frame 18, shown in FIG. 4. This movement of the IPD adjustment assembly release elements is due to the user's thumbs engaging the grasping portion 76 of the IPD adjustment assembly release elements 60 and pressing upward, thus compressing the IPD springs 62.

Figure 11:
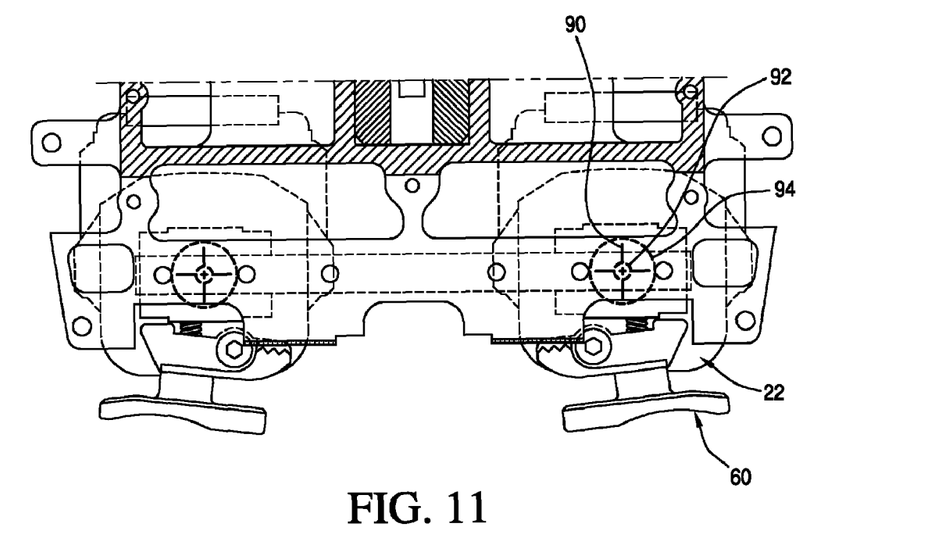
FIG. 11 shows the crosshairs centered on the pupil with the IPD release elements open.

FIG. 11 shows the crosshairs centered on the pupil 92 of the eyeball 94 with the IPD adjustment assembly release elements 60 open. In this configuration, the IPD adjustment assembly release elements are in the unlocked position described in the previous paragraph. The right and left ISA's are now centered on the pupil 92 of the eye 94.

Figure 12:
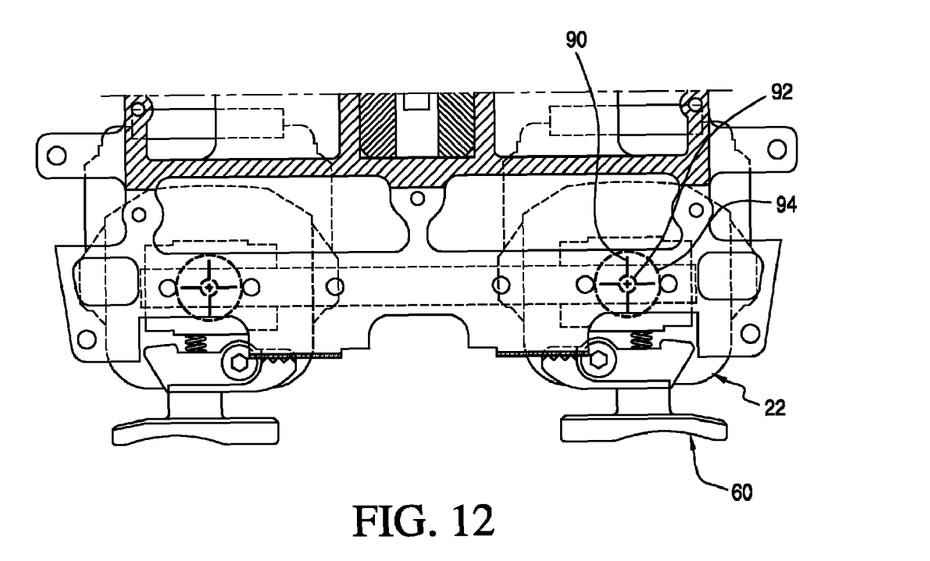
FIG. 12 shows the crosshairs centered in the pupil.

FIG. 12 shows the crosshairs 90 centered in the pupil 92. In this configuration, the IPD adjustment assembly release elements are in the locked position described above. The right and left ISA's are now centered on the pupil 92 of the eye 94. IPD adjustment is now complete.

Figure 13:
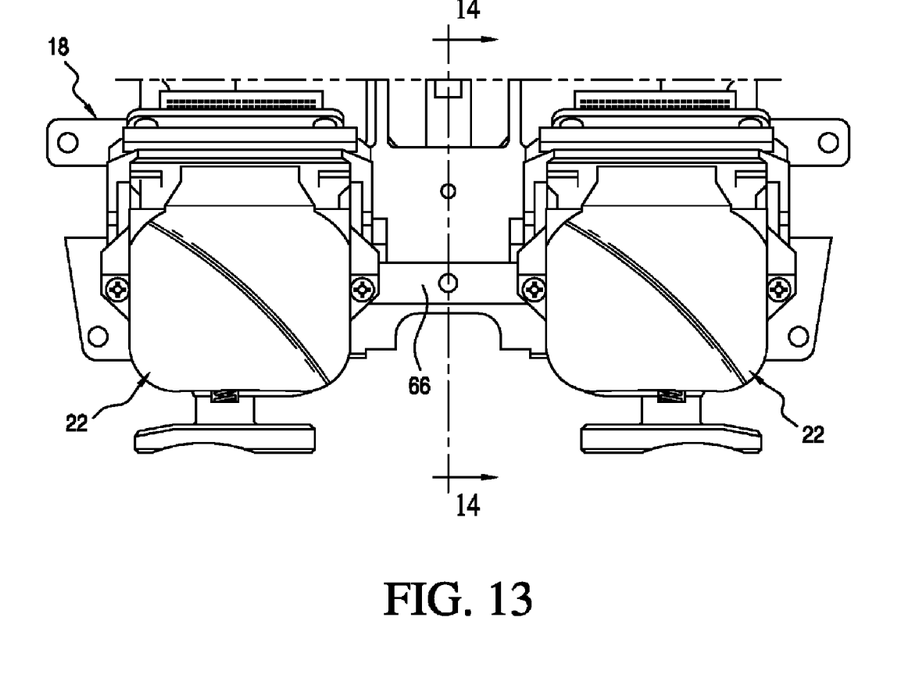
FIG. 13 is a rear elevation of the IPD adjustment assembly.
Figure 14:
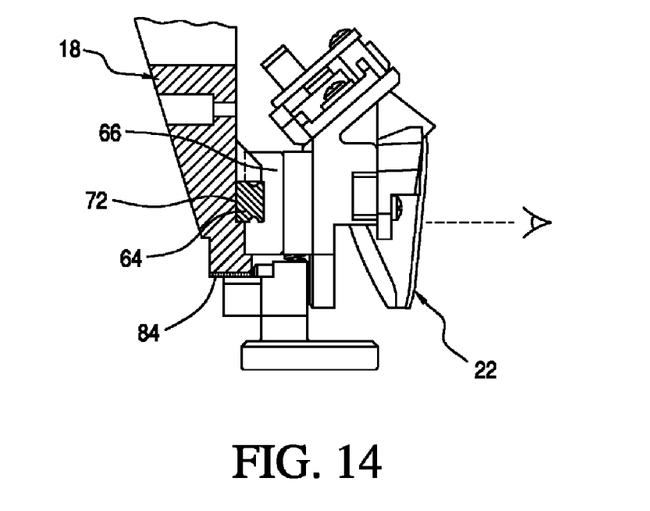
FIG. 14 is a sectional view, taken along line 13-13 of FIG. 13.
Figure 15:
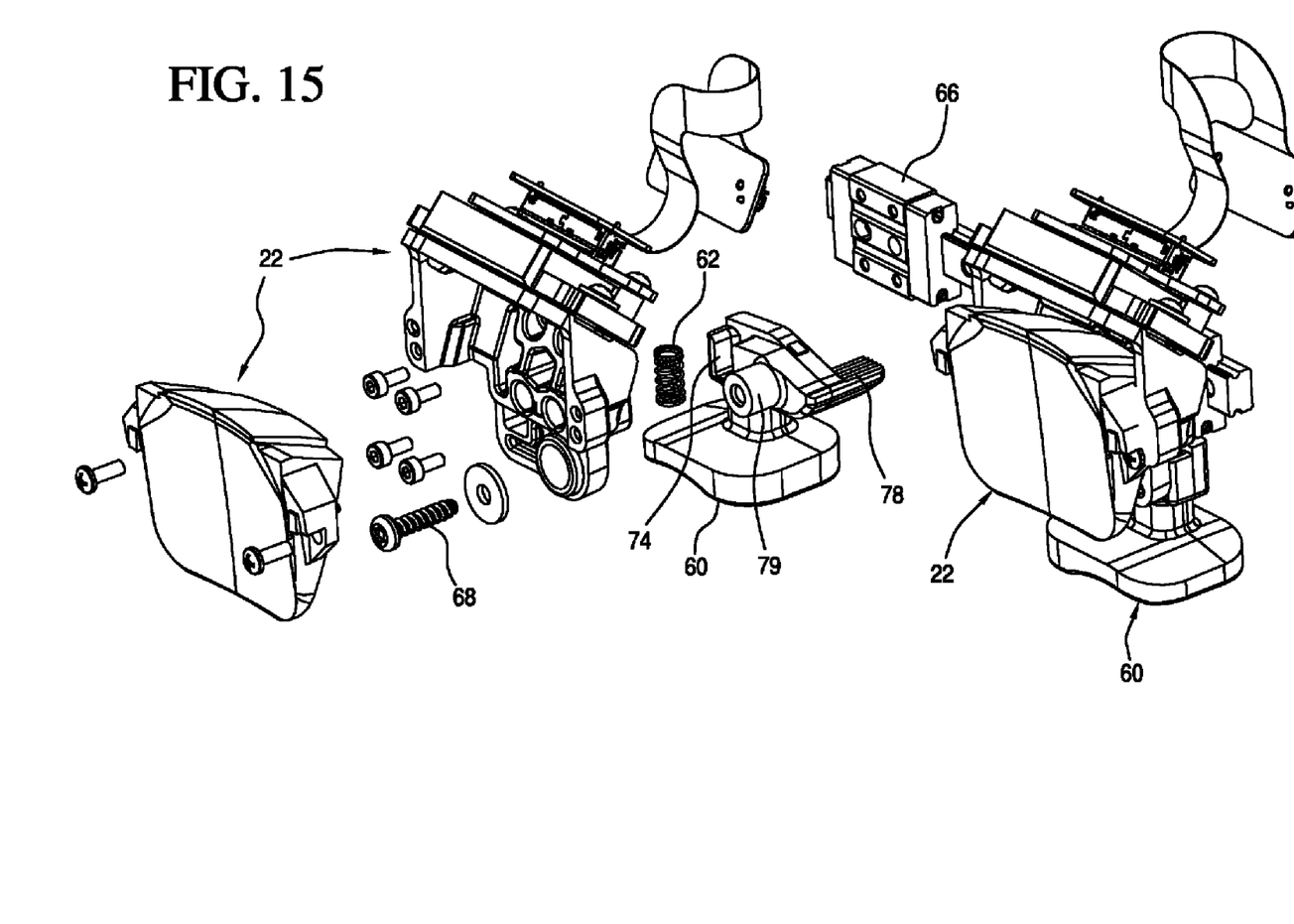
FIG. 15 is an exploded perspective view of the IPD adjustment assembly.

FIG. 13, a rear elevation of the IPD adjustment assembly 56, shows the location of the section taken in FIG. 14. FIG. 14, a sectional view, taken along line 13-13 of FIG. 13, shows the mounting interface 72 and the locating interface 84. FIG. 15 illustrates the spatial relationship of the components of the IPD adjustment assembly 56.

Other embodiments and configurations may be devised without departing from the spirit of the invention and the scope of the appended claims.

The invention claimed is:

1. A quick adjustment assembly for a head or helmet mounted display, comprising:
   a) an adjustment plate assembly securely attachable to the head of a user via a helmet or head gear, said adjustment plate assembly comprising a single substantially flat plate element that remains stationary with respect to the head of the user, said flat plate element extending substantially perpendicular to the helmet or head gear; and,
   b) an eye relief assembly mountable on said adjustment plate assembly, comprising:
      i. a main frame for supporting at least one image source assembly (ISA); and,
      ii. a pair of opposing pressure plate assemblies supported by said main frame, each pressure plate assembly including;
         1. an eye relief adjustment release element engageable by the user; and,
         2. at least one pressure plate friction pad assembly operatively engageable with said adjustment plate assembly to provide selectable positioning of said eye relief assembly along a plane of movement relative to said adjustment plate assembly allowing three-degrees of freedom movement along said plane of movement.

2. The quick adjustment assembly of claim 1, wherein said eye relief assembly further comprises a pair of bearing plate assemblies, each bearing plate assembly, comprising:
   a) a bearing plate frame having a recess;
   b) compressible material positioned in the recess; and,
   c) a low coefficient of friction pad operatively positioned relative to said compressible material.

3. The quick adjustment assembly of claim 1, further comprising an interpupillary (IPD) adjustment assembly adapted to securely support said at least one ISA, said IPD adjustment assembly including at least one associated IPD release element operably associated with said eye relief assembly for adjusting the IPD adjustment range.

4. The quick adjustment assembly of claim 3, wherein said at least one associated IPD release element comprises two IPD release elements, each IPD release element being associated with an eye.

5. The quick adjustment assembly of claim 1, wherein said adjustment plate assembly further comprises:
   a) a mounting interface portion for secure attachment to the helmet or headgear;
   b) said substantially flat plate element being integral to said mounting interface portion; and,
   c) a retaining cap securely attachable to said plate element for maintenance, assembly, and serviceability.

6. The quick adjustment assembly of claim 1 further comprising an interpupillary (IPD) adjustment assembly adapted to securely support said at least one ISA, said IPD adjustment assembly, comprising:
   a) a rail assembly secured to the main frame, comprising:
      i. a rail; and,
      ii. a pair of carriages slideably supported by said rail, each carriage being adapted to securely support an ISA;
   b) a pair of IPD release elements, each IPD release element, comprising:
      i. an IPD gripping portion for securely positioning said IPD release element relative to an IPD interface of said main frame;
      ii. an IPD spring engaging portion;
      iii. a grasping portion secured to said gripping portion engageable by the user; and,
      iv. a pivot shaft for rotatable engagement with an associated carriage through the ISA; and,
   c) a pair of IPD springs, each IPD spring positioned between a respective IPD spring engaging portion and an ISA for providing a clamping of the ISA to said main frame.

7. The quick adjustment assembly of claim 1 wherein said eye relief assembly further comprises an interpupillary (IPD) adjustment assembly adapted to securely support said at least one ISA, said IPD adjustment assembly, comprising:
   a) a rail assembly secured to the main frame, comprising:
      i. a rail; and,
      ii. a pair of carriages slideably supported by said rail, each carriage being adapted to securely support an ISA;
   b) a pair of IPD adjustment assembly release elements, each IPD release element, comprising:
      i. an IPD adjustment assembly gripping portion for securely positioning said IPD release element relative to an IPD adjustment assembly interface of said main frame;
      ii. an IPD adjustment assembly spring engaging portion;
      iii. a grasping portion secured to said gripping portion engageable by the user; and,
      iv. a pivot shaft for rotatable engagement with an associated carriage through the ISA;
   c) a pair of IPD springs, each IPD spring positioned between a respective IPD spring engaging portion and an ISA for providing a clamping of the ISA to said main frame; and,
   wherein said main frame, comprises:
      a pair of eye relief adjustment release element interfaces for providing the center of rotation for said eye relief adjustment release element; and,
      a pair of eye relief adjustment release element spring seats;
      an IPD adjustment assembly mounting interface for mounting said IPD adjustment assembly to said main frame and a pair of ISA locating interfaces for positively locating the ISA's; and,
      a bearing plate assembly interface portion.

8. The quick adjustment assembly of claim 1, wherein each of said opposing pressure plate friction pad assemblies comprises:
   a) a shaft portion operatively connected to said eye relief adjustment release element;
   b) a pressure plate portion connected to said shaft portion; and,
   c) a high coefficient of friction pad connected to said pressure plate portion.

9. A method for adjusting a head or helmet mounted display, comprising the steps of:
   a) engaging a pair of eye relief adjustment release elements of a pair of opposing pressure plate assemblies supported by a main frame of an eye relief assembly, said main frame supporting at least one image source assembly (ISA); and,
   b) depressing said pair of eye relief adjustment release elements to allow said main frame to adjustably mount on an adjustment plate assembly which is securely attached to the head of a user via a helmet or head gear, said adjustment plate assembly comprising a single substantially flat plate element that remains stationary with respect to the head of the user, said flat plate element extending substantially perpendicular to the helmet or head gear, each of said pressure plate assemblies including at least one pressure plate friction pad assembly operatively engageable with said adjustment plate assembly to provide selectable positioning of said eye relief assembly along a plane of movement relative to said adjustment plate assembly allowing three-degrees of freedom movement along said plane of movement.

10. The method of claim 9, further comprising the step of depressing a pair of IPD release elements of an interpupillary (IPD) adjustment assembly adapted to securely support said at least one ISA, said IPD release elements operably associated with said eye relief assembly for adjusting the IPD adjustment range.

11. The method of claim 10, wherein said step of engaging a pair of eye relief adjustment release elements comprises engaging an eye relief assembly comprising a pair of bearing plate assemblies, each bearing plate assembly of a type having:
   a) a bearing plate frame having a recess;
   b) compressible material positioned in said recess; and,
   c) a low coefficient of friction pad operatively positioned relative to said compressible material.

12. A quick adjustment assembly for a head or helmet mounted display, comprising:

a) an adjustment plate assembly securely attachable to the head of a user via a helmet or head gear; and,
b) an eye relief assembly mountable on said adjustment plate assembly, comprising:
  i. a main frame for supporting at least one image source assembly (ISA);
  ii. a pair of opposing pressure plate assemblies supported by said main frame, each pressure plate assembly including;
    1. an eye relief adjustment release element engageable by the user; and,
    2. at least one pressure plate friction pad assembly operatively engageable with said adjustment plate assembly to provide selectable positioning of said eye relief assembly along a plane of movement relative to said adjustment plate assembly allowing three-degrees of freedom movement along said plane of movement; and,
  iii. a pair of bearing plate assemblies, each bearing plate assembly, comprising;
    1. a bearing plate frame having a recess;
    2. compressible material positioned in the recess; and,
    3. a low coefficient of friction pad operatively positioned relative to said compressible material; and,
c) an interpupillary (IPD) adjustment assembly adapted to securely support said at least one ISA, said IPD adjustment assembly including at least one associated IPD release element operably associated with said eye relief assembly for adjusting the IPD adjustment range.

13. The quick adjustment assembly of claim 12, wherein said adjustment plate assembly comprises:
a) a mounting interface portion for secure attachment to the helmet or headgear;
b) a substantially flat plate element integral to said mounting interface portion; and,
c) a retaining cap securely attachable to said plate element for maintenance, assembly, and serviceability.

14. The quick adjustment assembly of claim 12, wherein said IPD adjustment assembly comprises:
a) a rail assembly secured to the main frame, comprising:
  i. a rail; and,
  ii. a pair of carriages slideably supported by said rail, each carriage being adapted to securely support an ISA;
b) a pair of IPD release elements, each IPD release element, comprising:
  i. an IPD gripping portion for securely positioning said IPD release element relative to an IPD interface of said main frame;
  ii. an IPD spring engaging portion;
  iii. a grasping portion secured to said gripping portion engageable the user; and,
  iv. a pivot shaft for rotatable engagement with an associated carriage through the ISA; and,
c) a pair of IPD springs, each IPD spring positioned between a respective IPD spring engaging portion and an ISA for providing a clamping of the ISA to said main frame.

15. The quick adjustment assembly of claim 12, wherein said IPD adjustment assembly comprises:

a) a rail assembly secured to the main frame, comprising:
  i. a rail; and,
  ii. a pair of carriages slideably supported by said rail, each carriage being adapted to securely support an ISA;
b) a pair of IPD adjustment assembly release elements, each IPD release element, comprising:
  i. an IPD adjustment assembly gripping portion for securely positioning said IPD release element relative to an IPD adjustment assembly interface of said main frame;
  ii. an IPD adjustment assembly spring engaging portion;
  iii. a grasping portion secured to said gripping portion engageable the user; and,
  iv. a pivot shaft for rotatable engagement with an associated carriage through the ISA;
c) a pair of IPD springs, each IPD spring positioned between a respective IPD spring engaging portion and an ISA for providing a clamping of the ISA to said main frame; and,
wherein said main frame, comprises:
  a pair of eye relief adjustment release element interfaces for providing the center of rotation for said eye relief adjustment release element;
  a pair of eye relief adjustment release element spring seats;
  an IPD adjustment assembly mounting interface for mounting said IPD adjustment assembly to said main frame and a pair of ISA locating interfaces for positively locating the ISA's; and,
  a bearing plate assembly interface portion.

16. The quick adjustment assembly of claim 12, wherein each of said opposing pressure plate friction pad assemblies comprises:
a) a shaft portion operatively connected to said eye relief adjustment release element;
b) a pressure plate portion connected to said shaft portion; and,
c) a high coefficient of friction pad connected to said pressure plate portion.

17. A quick adjustment assembly for a head or helmet mounted display, comprising:
an adjustment plate assembly securely attachable to the head of a user via a helmet or head gear, said adjustment plate assembly comprising a single substantially flat plate element that remains stationary with respect to the head of the user, said flat plate element extending substantially perpendicular to the helmet or head gear;
an eye relief assembly adjustably mountable on the adjustment plate assembly;
a pressure plate assembly configured to adjustably mount the eye relief assembly to the adjustment plate assembly;
an eye relief adjustment release element; and
at least one pressure plate friction pad assembly operatively engageable with the adjustment plate assembly through use of the eye relief adjustment release element so as to provide selectable positioning of the eye relief assembly along a plane of movement relative to the adjustment plate assembly.

* * * * *